United States Patent [19]

Heinzl

[11] Patent Number: 4,544,933

[45] Date of Patent: Oct. 1, 1985

[54] APPARATUS AND METHOD FOR INK DROPLET EJECTION FOR A PRINTER

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 646,146

[22] Filed: Aug. 31, 1984

[30] Foreign Application Priority Data

Sep. 20, 1983 [DE] Fed. Rep. of Germany ....... 3333939

[51] Int. Cl.[4] ............................................ G01D 15/18

[52] U.S. Cl. ................................ 346/140 R; 310/330

[58] Field of Search ................ 346/140 PD; 310/330, 310/331

[56] References Cited

U.S. PATENT DOCUMENTS

| | | | |
|---|---|---|---|
| 3,924,974 | 12/1975 | Fischbeck . | |
| 3,946,398 | 3/1976 | Kyser . | |
| 4,072,959 | 2/1978 | Emlqvist ........................ | 346/140 R |
| 4,158,847 | 6/1979 | Heinzl . | |
| 4,336,544 | 8/1980 | Donald . | |

FOREIGN PATENT DOCUMENTS 2905063 8/1980 Fed. Rep. of Germany .

OTHER PUBLICATIONS

IBM Technical Disclosure Bulletin, vol. 16, No. 2, pp. 467–468, Hochberg et al., Jul. '73.

IBM Technical Disclosure Bulletin, vol. 16, No. 6, p. 1834.

IBM Technical Disclosure Bulletin, vol. 18, No. 7, pp. 2195–2196.

*Primary Examiner*—E. A. Goldberg
*Assistant Examiner*—Frederick L. Kampe
*Attorney, Agent, or Firm*—Hill, Van Santen, Steadman & Simpson

[57] ABSTRACT

A drive arrangement for generating droplets in an ink jet printer incorporates an ink channel with a plurality of discharge openings, and a plurality of conductor loops having their ends secured on both sides of an ink channel, such loops having V-shaped movable central parts located within the ink channel. A magnet system extending over the entire length of the channel generates a magnetic field in the region of the central parts of the drive elements. Each drive element is forced toward its discharge opening by changing the current through the conductor loops, causing an ejection of a droplet from its associated discharge opening.

8 Claims, 4 Drawing Figures

APPARATUS AND METHOD FOR INK DROPLET EJECTION FOR A PRINTER

BACKGROUND

1. Field Of The Invention

The present invention relates to a method and apparatus for generating individual droplets of ink in a printer device.

2. The Prior Art

A number of developments have been made in piezo-ceramic elements for use as drive elements for the ejection of individual droplets of ink in printer apparatus. Such drive elements typically have the form of piezo-electric plates or piezo-electric tubes. In the former, a piezo-electric plate forms a wall of an ink chamber which is connected to one side to an ink rersevoir and at its other side, to a discharge jet. When the plate is electrically driven, a volume change occurs in the ink chamber, due to a mechanical change in shape of the plate, with the volume change resulting in the ejection of a droplet. Such an apparatus is shown in German Pat. No. OS 2,132,082. In the latter case, the piezo-electric tube embraces a part of a tubular ink channel which is connected between a reservoir and a discharge jet. When the tube is energized, a pressure wave is generated inside the ink channel which results in the ejection of a droplet.

It is also known to design piezo-electric drive elements in a comb form as shown in German Pat. No. AS 2,527,647. The free ends of the comb teeth are allocated to discharge openings such that a droplet is ejected from an opening when its associated tooth is electrically driven.

Other developments have employed piezo-ceramic materials. However, the handling and processing of piezo-ceramic materials is difficult and time consuming. Moreover, processes using piezo-ceramic materials are relatively costly, because the positioning of drive elements relative to each other in a print head require extreme precision. In addition, problems occur in connection with the selection of individual drive elements. A slight modification in the structure of a piezo-ceramic element resulting from change in the ambient temperature or change in the ink composition requires individual balancing of each individual drive element.

Accordingly, it is desirable to provide an apparatus and method for increasing the simplicity of design and construction of piezo-ceramic elements, and reducing their costs.

SUMMARY OF THE INVENTION

A principal object of the present invention is to provide a method and apparatus for the ejection of individual droplets of ink in a printer apparatus which employs material which is easy to work with and which presents fewer problems in connection with the design and construction of a print head.

In accordance with one embodiment of the present invention, this object is obtained by employing a plurality of individually drivable transducer elements for ejecting droplets from associated discharge openings, a common gap-size ink channel, the drive elements being secured at both sides of the ink channel and having a movable central part allocated an individual discharge opening, and a magnetic system for generating a magnetic field penetrating the movable central parts of the drive elements for causing such central parts to execute a rapid motion in the direction toward the discharge opening.

The present invention employs an application of the electro-dynamic principal. As a result, a simple and operationaly reliable structure results, which is at the same time relatively inexpensive to manufacture and uses materials which are easy to work with. A write head constructed in accordance with the invention may be formed as an integrated component, in a series of layers, and can be easily wired. In addition, the distance between the discharge openings can be very small with the result that very good print quality can be achieved. Since the number of drive elements and therefore the number of discharge openings in a jet plate forming an outer surface of a print head can be considerably higher than in previous arrangements, a relative broad write head extending over an entire line length, can be constructed. In this event, dramatic increase in the printing speed can be achieved.

Other objects and advantages of the present invention will become manifest by an inspection of the following description and the accompanying drawings.

BRIEF DESCRIPTION OF THE DRAWINGS

Reference will now be made to the accompanying drawings in which.

DESCRIPTION OF THE PREFERRED EMBODIMENT

Figure 1:
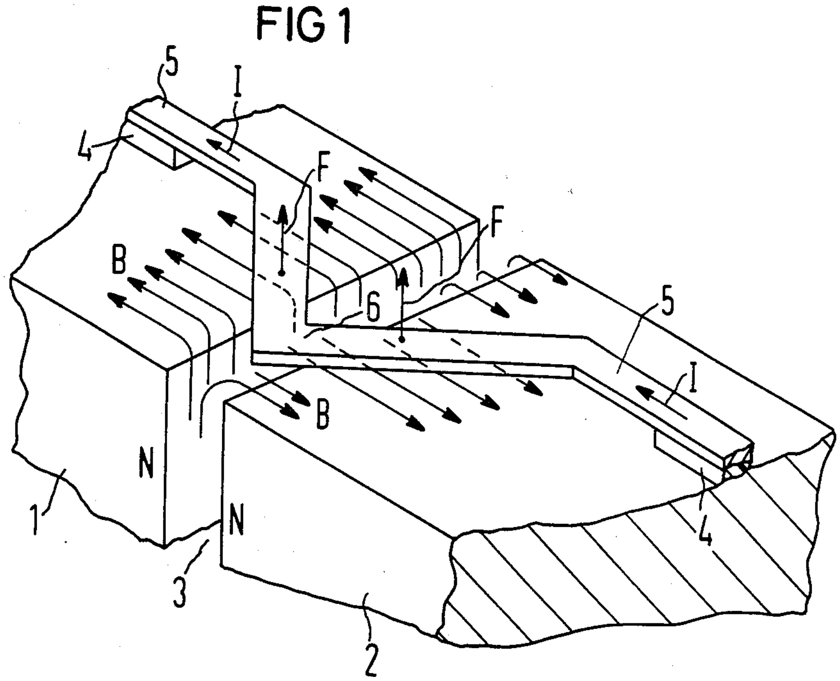
FIG. 1 is an illustration illustrating the operating principal employed in the present invention.

Referring to FIG. 1, an apparatus is shown having a magnet system which generates a magnetic field, the field lines of which have a high density in a limited volume of space. The magnetic field lines B are divided. The magnet system in FIG. 1 consists of two magnet members 1 and 2 which are disposed such that the poles of like sign (the two north poles in the example) are spaced opposite each other, separated by a short distance to form a narrow interspace 3. The magnetic field lines B emerge from the center space and proceed outwardly therefrom in opposite directions, in parted fashion as illustrated by the arrows in FIG. 1.

A conductor loop 5 is secured to an insulating mount 4 at both sides of the interspace 3, and has end portions which are oriented perpendicularly relative to the interspace 3. Between the end portions, a central V-shape portion is connected in the area of maximum concentration of the magnetic field lines B. The element 5 is movable in that it can be deflected or bent down out of its quiescent position, at least in the region of the interspace 3. Such a movement takes place when a current I traverses the element 5. When the magnetic field lines are such as illustrated in FIG. 1, and the current I flowing through the conductor loop 5 is in the direction of the arrow I, then an upwardly directed force F acts on the two legs of the central part 6. A rapid onset of the current I thus leads to a sudden excursion or a flexion of the element 5 toward the upper direction. The direction of the force F and, therefore, the direction of the movement of the cental part 6 of the element 5 is dependent upon the direction of the current I, and also on the direction of the magnetic field lines B. The magnitude of the force F, and thus the magnitude and time duration of the motion of the central part 6, is also dependent upon the intensity of the current, and the length of the portion intersecting the magnetic field lines. The direction of the force F is upward in both halves of the V-shaped center part 6, even though the direction of the field B is reversed in the two halves, because the direction of the current I relative to the field lines B is the same in each case. For example, in FIG. 1, in each case, (viewed in the direction of the current), the field lines B cut through the conductor from right to left.

Figure 2:
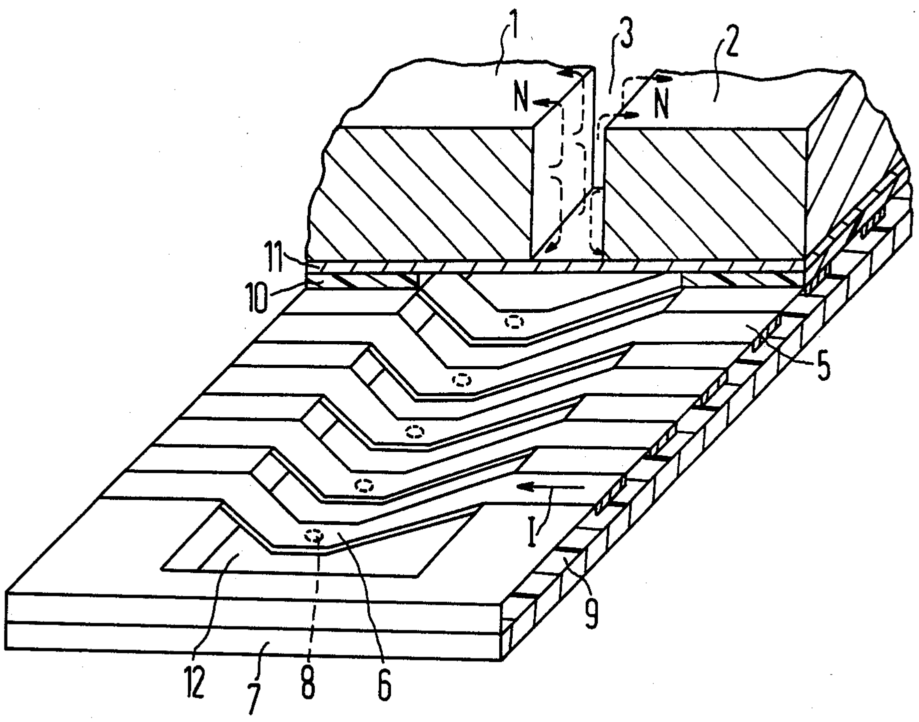
FIG. 2 is a perspective view of an exeplary embodiment of the present invention in the form of a multi-jet print head.

FIG. 2 illustrates a perspective view of an ejection mechanism for an ink jet printer having a plurality of discharge openings, and which operates in accordance with the principals of FIG. 1. The print head shown in FIG. 2 is constructed in the form of a series of layers. A jet plate 7 forms the bottom layer and has a plurality of discharge openings or jet openings 8. The jet plate 7 forms the lower wall of the ink chamber 12 whose upper wall is formed by sealing plate 11 (shown cut away in FIG. 2). Spacer elements 9 and 10 which extend throughout the length of the print head are interposed between jet plates 7 and the sealing plate 11 to define the lateral and end walls of the ink channel 12. They also serve to support the conductive drive elements 5. In the arrangement shown in FIG. 2, the lower spacer 9 has a plurality of recesses for receiving the conductor loops 5 which are maintained between the spacers 9 and 10 in assembled condition. Alternatively, the drive elements may be formed as contact surfaces during the production of the spacer 9. The conductive drive elements 5 can be designed, for example, in the form of narrow metallic strips having V-shaped central sections pointing forwardly, as shown, in the region of the ink chamber. This part of the drive element forms the V-shaped central part 6 referred to in connection with FIG. 1. They are disposed such that the front end of each central part 6 is situated directly above the discharge opening 8 of the jet plate 7. In the arrangement shown in FIG. 2, the V-shaped central section 6 has a central portion which is a straight line section oriented in parallel with the orientation of the end parts of the conductor loops 5.

The magnet system incorporating a pair of permanent magnets 1 and 2 is disposed above the sealing plate 11. The magnetic field lines B of the magnetic field issue from the interspace 3 both upwardly and downwardly, and divide at the edge of the interspace 3. The magnetic field is intense in the vacinity of the interspace 3, and the field lines penetrate the V-shaped center section 6 of the drive elements 5 such that the central part of the drive elements 5 is deflected or bent downwardly in response to a current I flowing through the drive element from right to left as illustrated by the arrow. As a result, a small quantity of ink is pressed out at high speed from the corresponding discharge openings of the drive elements which are excited, departing from such opening in the form of a droplet. On cessation of the current I, the V-shaped movable central parts 6 of the drive element returns to its normal position, allowing writing fluid from the reservoir to fill the space between the central portion 6 and the discharge opening 8. A slight overshoot in the opposite (or upward) direction secures the replenishment of writing fluid into the space.

In FIG. 2 the spacer 10, the upper plate 11, and the magnets 1 and 2 extend throughout the entire length of the printhead assembly, but these parts have been shown cut away for a greater clarity.

The overall arrangement is constructed in layers. Since it is not restricted to specific arrangement of the jet openings 8, and since the magnetic field is jointly allocated to all of the drive elements, and also since the overall arrangement consists of only a few parts which can be simply and inexpensively manufactured, a write head constructed in the form illustrated in FIG. 2 can have the dimensions of an entire print line. This enables the construction of a printer which produces characters of an entire print line formed simultaneously on a line-by-line basis, with a dramatic increase in printing speed compared with that of present dot-matrix printers.

The jet plate 7, the spacer elements 9 and 10 and the sealing plate 11 consist, for example, of planar layers in the form of flat sheets. The drive elements 5 can also be designed as planar layers.

Figure 3:
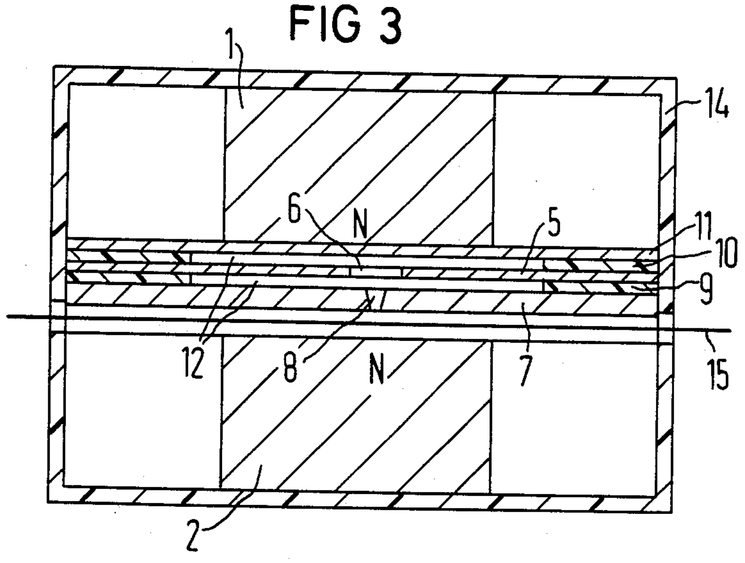
FIG. 3 is a cross-section taken through one plane of a print head and incorporating the apparatus of FIG. 2.
Figure 4:
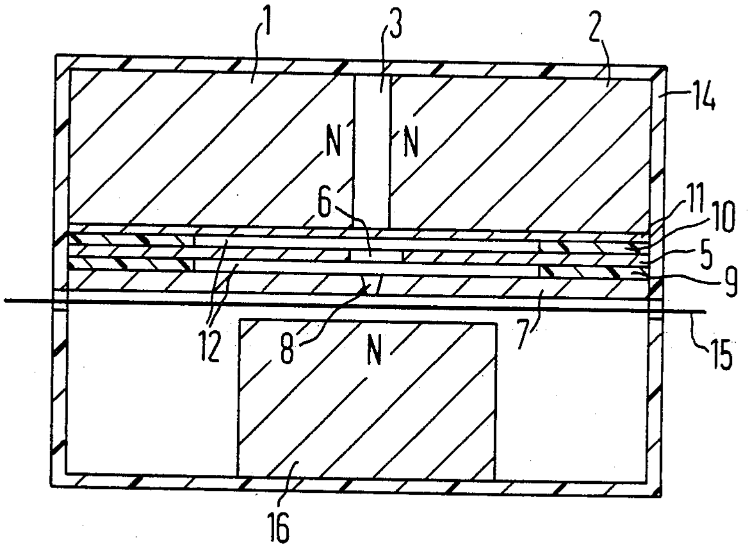
FIG. 4 is a vertical cross-section taken through another plane of a print head incorporating the apparatus of FIG. 2.

Referring to FIGS. 3 and 4, arrangements of the present invention are illustrated in which a relative motion is possible between a recording medium 15 and the write head. The drive elements 5 of the write head are driven with corresponding current pulses by a source of drive current (not shown) and the desired characters may be constructed by means of ink droplets sprayed onto the recording medium at different positions, as the motion of the recording medium takes place, to form characters in matrix or raster-like fashion.

The arrangement of the magnetic system is not restricted to the examples illustrated in FIGS. 1 and 2. It is also contemplated by the present invention to place the magnet system such that one magnet member is arranged on sealing plate 11 and the other magnetic member is arranged opposite, outside of the discharge jets 8 and the jet plate 7, as illustrated in FIGS. 3 and 4. In the case of FIG. 3, the magnetic field lines issue from the interspace 3 in diverse directions, intersecting the legs of the drive element in a region having a high magnetic field density.

In another arrangement, the magnet system can be constructed of more than two magnet members, as illustrated in FIG. 4. In the case of FIG. 4, two magnet members 1 and 2 are located above the sealing plate 11, with a further magnet member 16 being disposed opposite the jet plate 7. The magnet members 1, 2 and 16 are disposed such that like poles (the north pole in the example), face toward each other as illustrated. This arrangement enjoys a further improvement in that the magnetic field lines are constrained to be close and parallel with the jet plate 7, increasing the magnetic field density in the region of the V-shaped central portions of the drive elements 5.

In the arrangements of FIG. 3 and 4, a slot-like opening is provided for the introduction and removal of the recordin medium 15 into association with the print head.

It will be appreciated that various additions and modifications may be made in the apparatus of the present invention without departing from the essential features of novelty thereof, which are intended to be defined and secured by the apended claims.

What is claimed is:

1. Apparatus for generating individual ink droplets in an ink jet printer having individually drivable discharge elements for ejecting droplets from discharge openings associated therewith and which communicate with an ink jet chamber comprising, in combination;, a common ink channel for a series of discharge elements, a plurality of conductive drive elements, one for each of said discharge openings, said drive elements each being secured at both sides of the ink channel and having a movable central part within said ink channel, said central part being associated with an individual discharge opening, a magnet system for generating a magnetic field penetrating at least the movable central parts of all drive elements, such that said central part is caused to move in the direction toward the ejection opening in response to a change in current flow through said element.

2. Apparatus according to claim 1, wherein said drive elements each comprise a conductive loop secured by electrical insulators at opposite sides of said ink channel, said central part comprising a V-shaped section within said ink channel, the apex of said V-shaped section being positioned directly over said discharge opening, and said magnet system generating a magnetic field in the region of V-shaped central part.

3. Apparatus according to either of claims 1 or 2, wherein said drive elements are adapted to be driven with current, pulses, such current crossing the direction of the magnetic field lines so that the movable central parts of the drive elements are moved in the direction toward the discharge opening allocated to said drive element.

4. Apparatus according to claim 3, wherein said magnet system comprises at least two magnet members for generating a magnetic field in the region of all of said drive elements, each of said magnet members having poles of like sign oriented toward each other in the region of said central parts of said drive elements, said magnetic field issuing from the interspace between said magnet members in at least two different directions.

5. Apparatus according to either of claims 1 or 2, wherein said ink channel is formed by series of layers consisting of a jet plate, having said discharge openings, an upper sealing plate, and lateral spacer elements interposed between said jet plate and said sealing plate, said drive elements being disposed between said spacer elements, and said magnet system extending over the entire length of said ink channel.

6. Apparatus according to claim 5, wherein said magnet system comprises two magnet members disposed on said sealing plate.

7. Apparatus according to claim 5, wherein said magnet system comprises two magnet members, one magnet member being disposed on said sealing plate and the other magnet member being disposed at a position on the opposite side of said jet plate.

8. Apparatus according to claim 5, wherein said magnet system comprises at least three magnet members, two of said magnet members being disposed on said sealing plate, with the other magnet member being disposed on the opposite side of said jet plate.

* * * * *